March 13, 1962 H. S. DUNN 3,025,198
LIGHT TRANSMITTING INSULATED ROOF PANEL
Filed June 10, 1959

INVENTOR.
HAROLD S. DUNN,
BY
ATTORNEY

United States Patent Office 3,025,198
Patented Mar. 13, 1962

3,025,198
LIGHT TRANSMITTING INSULATED ROOF PANEL
Harold S. Dunn, 163 Fiesta Way, Nurmi Isles,
Fort Lauderdale, Fla.
Filed June 10, 1959, Ser. No. 819,447
4 Claims. (Cl. 154—45.9)

This invention relates to roofs and the like.

An object of the invention is to provide an improved heat insulated light transmitting panel for use in making patio roofs, marquees, skylights, and the like.

A further object of the invention is to provide a panel of the above-mentioned character formed of laminated plastics materials of a type which will afford a high degree of heat insulation, without appreciable loss of translucency.

Another object of the invention is to provide a roof panel of the above-mentioned character which is extremely lightweight but very strong and durable.

Still another object is to provide a light transmitting heat insulated roof panel embodying layers or sheets of unlike plastics materials which are bonded together in a durable and permanent manner without destroying the translucency or heat insulating qualities of the panel.

A further object is to provide a roof panel which will afford subdued illumination for a patio or the interior of a building utilizing the improved roof panel.

Other objects and advantages of the invention will become apparent during the course of the following description.

Figure 1:
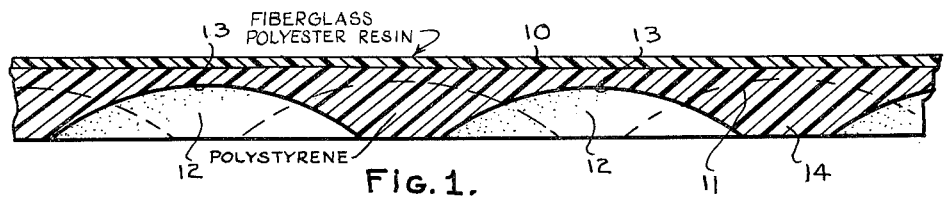
Figure 2:
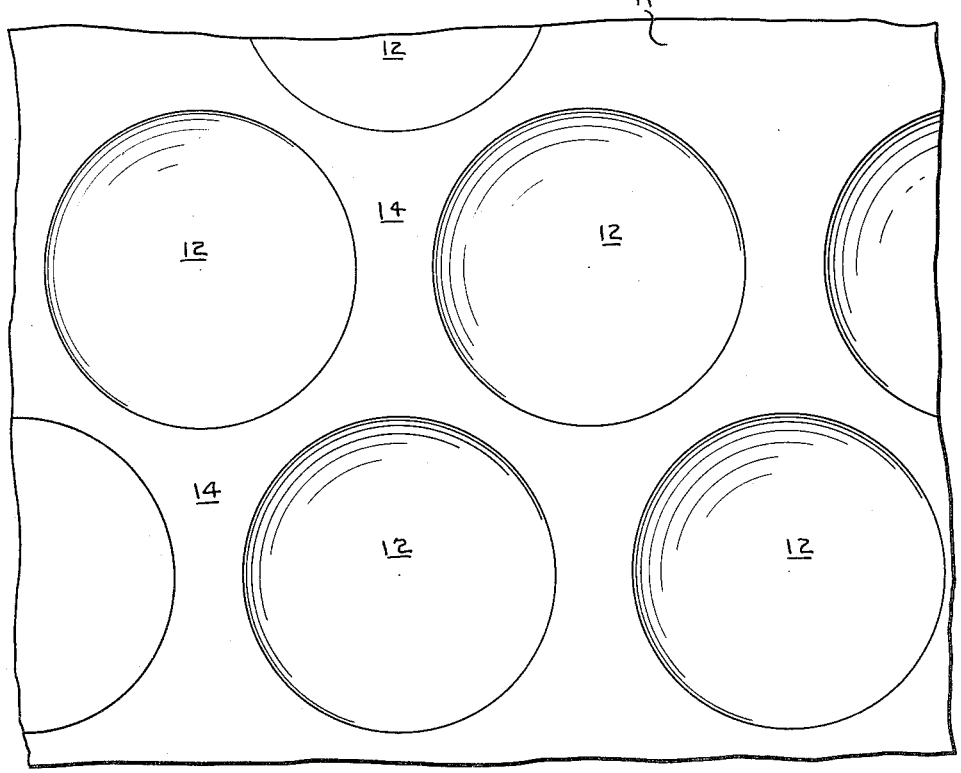
Figure 3:
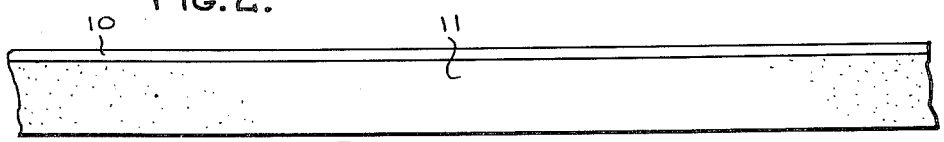
Figure 4:
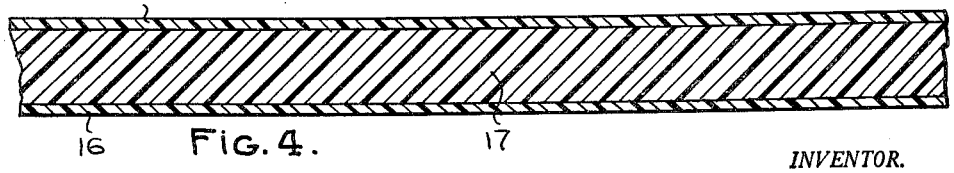

In the accompanying drawings forming a part of this application and in which like numerals are employed to designate like parts throughout the same, FIGURE 1 is a typical fragmentary vertical section through a roof panel embodying the invention, FIGURE 2 is a fragmentary bottom plan view of the same, FIGURE 3 is a fragmentary edge elevation of the roof panel, FIGURE 4 is a fragmentary vertical section through a roof panel illustrating a modified form of the invention.

In the drawings, wherein for the purpose of illustration is shown a preferred embodiment of the invention, the numeral 10 designates an outer or top relatively thin sheet of Fiberglas reinforced polyester resin, or the like. The sheet 10 which is exposed to the elements during use is extremely tough and durable and has excellent light transmitting characteristics, but poor heat insulating qualities, as is well known.

Arranged beneath the sheet 10 in superposed contacting relation therewith is a relatively thick layer or sheet 11 of low density expanded or foam polystyrene or like plastics material. The layer 11 and sheet 10 are permanently and durably bonded together by a suitable translucent neutral adhesive of a preferred or conventional type.

The expanded polystyrene layer 11 is light weight and relatively rigid, and has considerable ability to transmit light although its translucency is much less than that of the Fiberglas reinforced polyester resin sheet 10. The layer 11 might be defined as being semi-opaque, whereas the sheet 10 is rather highly translucent.

In order to increase the overall translucency of the roof panel composed of the sheet 10 and layer 11, the latter is preferably recessed on its underside at a multiplicity of points, as indicated at 12. The recesses 12 may be relatively large, as shown, and each recess is preferably spherically formed, although the shape of the recesses is not critical and may be varied. The recesses 12 are preferably closely spaced in rows on the roof panel, FIGURE 2, and the recesses 12 of adjacent rows are staggered, as shown.

Each recess 12 provides in the expanded polystyrene layer 11 a region 13 of materially reduced thickness at the top of the recess, and which region may be only slightly thicker than the thickness of the outer sheet 10. However, the thickness of the layer 11 at the tops of the recesses 12 is not critical and may be varied somewhat as found desirable. In the regions 14 between the recesses 12, the full thickness of the layer 11 is present, and the layer 11 decreases gradually in thickness between the open sides or bottoms of the recesses 12 and their tops which define the regions 13 of decreased thickness.

Obviously, the translucency of the layer 11 is greatest at the regions 13 of decreased thickness, and least at the regions 14 of maximum or full thickness. Some degree of light is transmitted through the layer 11 over its entire area however. The layer 11 is thick enough at all points to afford excellent heat insulating properties in the completed laminated roof panel. However, the heat insulating properties of the layer 11 are greatest at the regions 14 of maximum thickness.

If preferred, the expanded polystyrene layer 11 may be formed somewhat thinner than illustrated by the drawings, and the recesses 12 may be omitted entirely. If the recesses 12 are omitted, the thickness of the layer 11 should be such that the desired minimum heat insulating qualities are afforded, in balance with the desired minimum translucency for the roof panel.

When the panel above-described is employed as a roof, skylight or the like, the outer Fiberglas reinforced polyester resin sheet 10 is exposed to the weather and has all of the desirable qualities to withstand the effects of the weather for a very long period of time. The underlying layer 11 of low density expanded polystyrene is protected at all times from the weather by the outer sheet 10. The layer 11, due to its cellular formation, forms an excellent heat insulating layer or barrier upon the tough and durable sheet 10. The layer 11 also materially strengthens the sheet 10 and renders the roof panel substantially stiff or rigid. The laminated roof panel will transmit a soft or subdued light to the underlying area, such as a patio or the like. Where the recesses 12 are provided in the layer 11, increased translucency is provided at the tops of the recesses 12 and in the regions 13, as previously explained. The recesses 12 will impart to the roof panel a multiple lens effect, whereby relatively bright spots or areas of illumination will be afforded directly under the recessed areas of the layer 11. If the recesses 12 are omitted, as previously suggested, the roof panel will still be capable of transmitting sufficient light to provide subdued illumination, along with the desired heat insulating properties.

The panel is capable of a wide variety of uses, such as the construction of patio roofs, skylights, marquees, illuminating ceiling panels, light transmitting rigid awnings and the like.

In the form of the invention illustrated in FIGURE 4, there has been provided a panel having an upper sheet of Fiberglas reinforced polyester resin or the like 15 and a lower sheet of similar material 16. Bonded in sandwich fashion between the sheets 15 and 16, is a substantially solid and relatively thick sheet or layer 17 of expanded polystyrene or like plastics material. The sheets 15 and 16 are translucent, while the sheet or layer 17 is substantially semi-opaque, but being capable of transmitting a substantial degree of light transmission from the upper sheet 15 and through the lower sheet 16. This structure may be found desirable in panels of the type where a soft glow of light is desired yet, maintaining all of the insulating qualities of the sheet 17.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A roof panel comprising an outer translucent sheet of polyester resin, and a layer of cellular semi-opaque heat insulating plastics material having a flat face adhesively bonded to one side of said sheet, said layer having a multiplicity of closely spaced concave recesses formed in its side remote from said sheet, said recesses being uncovered and exposed and forming regions of decreased thickness in said layer enabling said layer to transmit substantial fractions of the light transmitted through said sheet.

2. A roof panel according to claim 1, wherein said layer is formed of low density polystyrene foam.

3. A roof panel comprising a relatively thin sheet of Fiberglas reinforced polyester resin adapted to withstand the elements and being translucent, and a relatively thick layer of low density polystyrene foam adhesively bonded to one side of said sheet and being coextensive therewith, said layer having a relatively low degree of translucency and having high insulating properties, said layer provided in its face remote from said sheet with a multiplicity of spaced concave recesses providing in said layer a corresponding number of regions of decreased thickness and interspaced regions of full thickness, said recesses being open and uncovered whereby said layer is capable of providing desired heat insulating properties in said roof panel and also capable of providing subdued illumination for the area covered by the roof panel.

4. A roof panel according to claim 3, wherein said concave recesses are arranged in rows in said layer and the recesses of adjacent rows are arranged in staggered relation.

References Cited in the file of this patent

UNITED STATES PATENTS

| | | |
|---|---|---|
| 232,399 | Geddes | Sept. 21, 1880 |
| 1,554,180 | Trader | Sept. 15, 1925 |
| 2,014,749 | Smith | Sept. 17, 1935 |
| 2,370,263 | Schweizer | Feb. 27, 1945 |
| 2,376,653 | Boyer | May 22, 1945 |
| 2,378,252 | Staehle | June 12, 1945 |
| 2,564,708 | Mochel | Aug. 21, 1951 |
| 2,576,073 | Kropa et al. | Nov. 20, 1951 |
| 2,747,651 | Lighter | May 29, 1956 |
| 2,764,516 | Pace | Sept. 25, 1956 |
| 2,806,812 | Merz | Sept. 17, 1957 |
| 2,862,240 | Meier et al. | Mar. 11, 1958 |
| 2,866,730 | Potchen et al. | Dec. 30, 1958 |
| 2,896,271 | Kloote et al. | July 28, 1959 |
| 2,908,602 | Collardeau et al. | Oct. 13, 1959 |